US010884817B2

United States Patent
Tong et al.

(10) Patent No.: US 10,884,817 B2
(45) Date of Patent: Jan. 5, 2021

(54) METHOD AND APPARATUS FOR PARALLEL EXECUTION IN TERMINAL DATABASE USING DATA PARTITIONS

(71) Applicant: Huawei Technologies Co., Ltd., Shenzhen (CN)

(72) Inventors: Qiang Tong, Beijing (CN); Zongchao Liu, Beijing (CN); Bo Shang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 15/917,166

(22) Filed: Mar. 9, 2018

(65) Prior Publication Data

US 2018/0196703 A1 Jul. 12, 2018

Related U.S. Application Data

(63) Continuation of application No. PCT/CN2017/071596, filed on Jan. 18, 2017.

(30) Foreign Application Priority Data

Jan. 30, 2016 (CN) .......................... 2016 1 0065053

(51) Int. Cl.
*G06F 9/46* (2006.01)
*G06F 9/50* (2006.01)
(Continued)

(52) U.S. Cl.
CPC .......... *G06F 9/5077* (2013.01); *G06F 9/3009* (2013.01); *G06F 9/3851* (2013.01);
(Continued)

(58) Field of Classification Search
CPC .... G06F 9/5077; G06F 9/3009; G06F 9/3851; G06F 9/4843; G06F 16/90335; G06F 16/278
See application file for complete search history.

(56) References Cited

U.S. PATENT DOCUMENTS 6,606,626 B1 * 8/2003 Ponnekanti ......... G06F 16/2308
7,372,857 B1 * 5/2008 Kappler .................. H04L 47/60
370/395.4
(Continued)

FOREIGN PATENT DOCUMENTS

CN 101706741 A 5/2010
CN 101799749 A 8/2010
(Continued)

OTHER PUBLICATIONS

"Clock rate", Wikipedia, Dec. 28, 2014 (Year: 2014).*
(Continued)

*Primary Examiner* — Bradley A Teets
(74) *Attorney, Agent, or Firm* — Conley Rose, P.C.

(57) ABSTRACT

A parallel execution method and apparatus in a terminal database, where the method includes determining, by a terminal, each thread central processing unit (CPU) based on a preset degree of parallelism, where the degree of parallelism is a quantity of threads executed in parallel, obtaining, by the terminal, a frequency of each thread CPU, calculating a frequency proportion of the thread CPUs, dividing, by the terminal, a to-be-queried data table in the terminal database into data partitions based on the frequency proportion of the thread CPUs, determining a data partition corresponding to each thread CPU, and querying in parallel, by the terminal, data in the corresponding data partition using each thread CPU.

20 Claims, 4 Drawing Sheets

(51) Int. Cl.
  *G06F 16/27* (2019.01)
  *G06F 16/903* (2019.01)
  *G06F 9/30* (2018.01)
  *G06F 9/38* (2018.01)
  *G06F 9/48* (2006.01)

(52) U.S. Cl.
  CPC ...... *G06F 16/278* (2019.01); *G06F 16/90335* (2019.01); *G06F 9/4843* (2013.01)

(56) References Cited

U.S. PATENT DOCUMENTS

| | | | |
|---|---|---|---|
| 2006/0218123 A1* | 9/2006 | Chowdhuri | ....... G06F 16/24532 |
| 2010/0094819 A1 | 4/2010 | Bornhoevd et al. | |
| 2011/0185358 A1 | 7/2011 | Ostrovsky et al. | |
| 2015/0039588 A1 | 2/2015 | Baeumges et al. | |
| 2015/0066972 A1 | 3/2015 | Liu et al. | |

FOREIGN PATENT DOCUMENTS

| | | | |
|---|---|---|---|
| CN | 102135901 A | 7/2011 | |
| CN | 103177059 A | 6/2013 | |
| CN | 104216684 A | 12/2014 | |
| CN | 104239153 A | 12/2014 | |

OTHER PUBLICATIONS

Machine Translation and Abstract of Chinese Publication No. CN101706741, May 12, 2010, 17 pages.

Machine Translation and Abstract of Chinese Publication No. CN104216684, Dec. 17, 2014, 21 pages.

Foreign Communication From a Counterpart Application, PCT Application No. PCT/CN2017/071596, English Translation of International Search Report dated Apr. 21, 2017, 2 pages.

Li, T., et al., "Operating System Support for Overlapping-ISA Heterogeneous Multi-core Architectures" XP031670708, The Sixteenth International Symposium on High-Performance Computer Architecture, Jan. 9, 2009, 12 pages.

Yoo, S., et al.,"A case for bad big.LITTLE switching: How to scale power-performance in SI-HMP," XP058072506, Proceedings of the Workshop on Power-Aware Computing and Systems, Oct. 4, 2015, 5 pages.

Foreign Communication From a Counterpart Application, European Application No. 17743637.5, Extended European Search Report dated Jul. 4, 2018, 11 pages.

Machine Translation and Abstract of Chinese Publication No. CN104239153, Dec. 24, 2014, 16 pages.

* cited by examiner

| addr | opcode | p1 | p2 | p3 | p4 | p5 | comment |
|------|--------|----|----|----|----|----|---------|
| 0 | Init | 0 | 149 | 0 | | 00 | |
| 2 | AuxThreadCreate | 1 | 20 | 0 | | 00 | # Create a thread 1 |
| 3 | AuxThreadCreate | 2 | 40 | 0 | | 00 | # Create a thread 2 |
| 4 | TablePartition | 1 | 0 | 0 | | 00 | # Perform dynamic partition on Table 1 |
| 5 | OpenRead | 1 | 19 | 0 | 00 | 00 | # Open Table 1 |
| ... | | | | | | | # A main thread executes logic |
| 20 | Close | 1 | 0 | 0 | | 00 | |
| 21 | AuxThreadProc | 1 | 41 | 0 | | 00 | # An entry location and an exit location of the thread 1 are 137 |
| ... | | | | | | | |
| 40 | AuxThreadExit | 1 | 0 | 0 | | 00 | # An entry location of the thread 1 |
| 41 | AuxThreadProc | 2 | 61 | 0 | | 00 | # An entry location and an exit location of the thread 2 are 137 |
| ... | | | | | | | |
| 60 | AuxThreadExit | 2 | 0 | 0 | | 00 | # An exit location of the thread 1 |
| 61 | AuxThreadjoin | 0 | 0 | 0 | | 00 | # The main thread waits until all threads end |
| ... | | | | | | | # Combine result sets of the main thread |
| 148 | Halt | 0 | 0 | 0 | | 00 | # Execution of a virtual machine ends |

FIG.1

METHOD AND APPARATUS FOR PARALLEL EXECUTION IN TERMINAL DATABASE USING DATA PARTITIONS

CROSS-REFERENCE TO RELATED APPLICATIONS

This application is a continuation of International Patent Application No. PCT/CN2017/071596 filed on Jan. 18, 2017, which claims priority to Chinese Patent Application No. 201610065053.0 filed on Jan. 30, 2016. The disclosures of the aforementioned applications are hereby incorporated by reference in their entireties.

TECHNICAL FIELD

The present application relates to the field of intelligent terminals, and in particular, to a parallel execution method and apparatus in a terminal database.

BACKGROUND

As an intelligent terminal has increasingly powerful functions and larger storage space, an amount of data stored in the intelligent terminal increases, and an amount of data queried by a user continuously increases. This results in longer response duration of an application on the terminal. On the other hand, a quantity of central processing unit (CPU) cores in the intelligent terminal constantly increases, and a processing capability is stronger. Taking advantage of multiple cores to accelerate a data query is an optimized trend of a database of the intelligent terminal.

Current databases in an intelligent terminal are basically lightweight open-source databases (for example, SQLITE). A conventional database in an intelligent terminal supports concurrent access to the database in multiple connections, but does not support concurrent execution of a single structured query language (SQL) statement. Therefore, if an SQL statement is complex and needs a large quantity of CPUs, a terminal database cannot take advantage of multiple cores in this case. Currently, CPUs of many terminals are based on a BIG.LITTLE architecture of an advanced reduced instruction set computing (RISC) machine (ARM) processor, and there are different cores such as a big core and a little core in this type of CPU. In addition, the terminal adjusts a CPU frequency according to a particular policy, and consequently, there is a great difference in execution duration when each CPU executes a same task. For a same quantity of tasks, execution duration of a little core in the CPU is generally one and a half times or two times execution duration of a big core. In addition, if the CPU frequency is limited, execution duration of the same quantity of tasks greatly increases.

Furthermore, the database of the intelligent terminal is generally not extremely large, and has a relatively strict requirement for query duration and update duration of the database. That is, the query duration and the update duration are usually less than one second, and a query related to interface display usually needs less than 200 milliseconds in order to ensure that some interface operations are not sensed by naked eyes. Therefore, the database of the intelligent terminal needs relatively short SQL statement parse and execution duration.

All conventional databases (for example, ORACLE and SQL SERVER) at a serving end support parallel execution of an SQL statement. A basic idea is that a user sets a degree of parallelism in the SQL statement or the database automatically sets a degree of parallelism according to a quantity of CPU cores. Then, a database execution engine analyzes a data distribution status in a data table, and then divides the data table into independent partitions for parallel execution.

Data analysis and data table division in the conventional databases at the serving end are usually complex, and a lot of statistics need to be collected. Therefore, preparation for such parallel execution is usually relatively time-consuming, and parallel execution is usually applicable to only an SQL statement that includes large-scale data and takes long execution duration. However, parallel execution is not applicable to an SQL statement that consumes only a few seconds. However, for the terminal database, execution duration of an SQL statement is generally only a few milliseconds or dozens of milliseconds, and if execution duration is more than 200 milliseconds, execution can be easily sensed by naked eyes, thereby affecting user experience. Therefore, in the terminal database, a data table cannot be divided using a lot of statistics. In addition, because there are different cores such as a big core and a little core in the CPU of the intelligent terminal, if to-be-executed tasks are equally allocated to each CPU core, the big core that completes execution needs to wait until the little core completes execution, thereby reducing execution efficiency.

In conclusion, if there are different cores such as a big core and a little core in a terminal CPU, how to take advantage of multiple cores to improve parallel execution efficiency of a terminal database is an urgent problem to be resolved.

SUMMARY

Embodiments of the present application provide a parallel execution method and apparatus in a terminal database in order to resolve a problem that if there are different cores such as a big core and a little core in a terminal CPU, parallel execution cannot be implemented in the terminal database using multiple cores.

Specific technical solutions provided in the embodiments of the present application are as follows.

According to a first aspect, an embodiment of the present application provides a parallel execution method in a terminal database, including determining, by a terminal, each thread CPU based on a preset degree of parallelism, where the degree of parallelism is a quantity of threads executed in parallel, obtaining, by the terminal, a frequency of each thread CPU, calculating a frequency proportion of the thread CPUs, dividing, by the terminal, a to-be-queried data table in the terminal database into data partitions based on the frequency proportion of the thread CPUs, determining a data partition corresponding to each thread CPU, and querying in parallel, by the terminal, data in the corresponding data partition using each thread CPU.

In a possible design, dividing, by the terminal, a to-be-queried data table in the terminal database into data partitions based on the frequency proportion of the thread CPUs may be implemented in the manner of reading, by the terminal, a quantity of layer-1 subpages that are in the data table and that are connected to an index root page, and dividing the layer-1 subpages into N data partitions according to the frequency proportion of the thread CPUs, where N is the preset degree of parallelism.

In a possible design, the terminal reads the quantity of layer-1 subpages that are in the data table and that are connected to the index root page, and divides the layer-1 subpages into the N data partitions according to the frequency proportion of the thread CPUs. In this case, a quantity proportion of the layer-1 subpages in the N data partitions is equal to or approximately equal to the frequency proportion of the thread CPUs. For example, when there is a relatively large quantity of layer-1 subpages, the terminal divides the layer-1 subpages into the N data partitions according to the frequency proportion of the thread CPUs, thereby rapidly implementing dynamic partition in the terminal database, and further improving data query efficiency of the terminal in each data partition.

In a possible design, dividing, by the terminal, a to-be-queried data table in the terminal database into data partitions based on the frequency proportion of the thread CPUs may be implemented in the manner of reading, by the terminal, a quantity of data recorded in each subpage in layer-1 subpages that are in the data table and that are connected to an index root page, and dividing, based on the quantity of data recorded in each subpage and according to the frequency proportion of the thread CPUs, data recorded in the layer-1 subpages into N data partitions, where N is the preset degree of parallelism.

In a possible design, the terminal reads the quantity of data recorded in each subpage in the layer-1 subpages, and divides, based on the quantity of data recorded in each subpage and according to the frequency proportion of the thread CPUs, the data recorded in the layer-1 subpages into the N data partitions. In this case, a quantity proportion of the data recorded in the layer-1 subpages in the N data partitions is equal to or approximately equal to the frequency proportion of the thread CPUs. For example, when there is a relatively small quantity of layer-1 subpages, the terminal continues to read the quantity of data recorded in each subpage in the layer-1 subpages in the data table, and divides, according to the frequency proportion of the thread CPUs, the data recorded in the layer-1 subpages into the N data partitions such that the quantity proportion of the data recorded in the data partitions is closer to the frequency proportion of the thread CPUs, and data partition division efficiency can further be ensured. This is a practical solution.

In a possible design, the data table is a data table in a B-tree format or a data table in a heap format.

In this way, a to-be-queried data table in a terminal database can be dynamically divided into partitions based on a frequency factor of each thread CPU in a terminal such that a thread CPU of a higher frequency queries a larger amount of data and a thread CPU of a lower frequency queries a smaller amount of data. In addition, parallel processing of a query instruction is performed on a corresponding data partition using each thread CPU, thereby greatly improving execution efficiency of a parallel query performed by a terminal on a database.

According to a second aspect, an embodiment of the present application provides a parallel execution apparatus in a terminal database, including a determining unit configured to determine each thread CPU based on a preset degree of parallelism, where the degree of parallelism is a quantity of threads executed in parallel, a calculation unit configured to obtain a frequency of each thread CPU, and calculate a frequency proportion of the thread CPUs, a dividing unit configured to divide a to-be-queried data table in the terminal database into data partitions based on the frequency proportion of the thread CPUs, and determine a data partition corresponding to each thread CPU, and a query unit configured to query in parallel data in the corresponding data partition using each thread CPU.

In a possible design, when dividing the to-be-queried data table in the terminal database into the data partitions based on the frequency proportion of the thread CPUs, the dividing unit is configured to read a quantity of layer-1 subpages that are in the data table and that are connected to an index root page, and divide the layer-1 subpages into N data partitions according to the frequency proportion of the thread CPUs, where N is the preset degree of parallelism.

In a possible design, the dividing unit reads the quantity of layer-1 subpages that are in the data table and that are connected to the index root page, and divides the layer-1 subpages into the N data partitions according to the frequency proportion of the thread CPUs. In this case, a quantity proportion of the layer-1 subpages in the N data partitions is equal to or approximately equal to the frequency proportion of the thread CPUs. When there is a relatively large quantity of layer-1 subpages, the dividing unit divides the layer-1 subpages into the N data partitions according to the frequency proportion of the thread CPUs, thereby rapidly implementing dynamic partition in the terminal database, and further improving data query efficiency of the terminal in each data partition.

In a possible design, when dividing the to-be-queried data table in the terminal database into the data partitions based on the frequency proportion of the thread CPUs, the dividing unit is configured to read a quantity of data recorded in each subpage in layer-1 subpages that are in the data table and that are connected to an index root page, and divide, based on the quantity of data recorded in each subpage and according to the frequency proportion of the thread CPUs, data recorded in the layer-1 subpages into N data partitions, where N is the preset degree of parallelism.

In a possible design, the dividing unit reads the quantity of data recorded in each subpage in the layer-1 subpages that are in the data table and that are connected to the index root page, and divides, based on the quantity of data recorded in each subpage and according to the frequency proportion of the thread CPUs, the data recorded in the layer-1 subpages into the N data partitions. In this case, a quantity proportion of the data recorded in the layer-1 subpages in the N data partitions is equal to or approximately equal to the frequency proportion of the thread CPUs. For example, when there is a relatively small quantity of layer-1 subpages, the dividing unit continues to read the quantity of data recorded in each subpage in the layer-1 subpages in the data table, and divides, according to the frequency proportion of the thread CPUs, the data recorded in the layer-1 subpages into the N data partitions such that the quantity proportion of the data recorded in the data partitions is closer to the frequency proportion of the thread CPUs, and data partition division efficiency can further be ensured. This is a practical solution.

In a possible design, the data table is a data table in a B-tree format or a data table in a heap format.

In this way, a to-be-queried data table in a terminal database can be dynamically divided into partitions based on a frequency factor of each thread CPU in a terminal such that a thread CPU of a higher frequency queries a larger amount of data and a thread CPU of a lower frequency queries a smaller amount of data. In addition, parallel processing of a query instruction is performed on a corresponding data partition using each thread CPU, thereby greatly improving execution efficiency of a parallel query performed by a terminal on a database.

According to a third aspect, an embodiment of the present application provides a terminal device, and the terminal device has a function of implementing operations of the terminal in the foregoing method design. The function may be implemented by hardware, or may be implemented by hardware by executing corresponding software. The hardware or the software includes one or more modules corresponding to the function. The module may be software and/or hardware.

In a possible design, a structure of the terminal device includes a memory and a processor, and the memory stores a program instruction. The processor controls the terminal device to divide a to-be-queried data table in a terminal database into data partitions according to the program instruction stored in the memory and based on a frequency proportion of thread CPUs in the terminal device, determine a data partition corresponding to each thread CPU, and query in parallel data in the corresponding data partition using each thread CPU.

According to a fourth aspect, an embodiment of the present application provides a computer storage medium. The computer storage medium is configured to store a computer software instruction used by the foregoing terminal and includes a program designed for executing the foregoing aspects.

According to the parallel execution solution in the terminal database in the embodiments of the present application, a to-be-queried data table in the terminal database is dynamically divided into partitions based on a frequency factor of each thread CPU in a terminal. In addition, parallel processing of a query instruction is performed on a corresponding data partition using each thread CPU, thereby greatly improving execution efficiency of a parallel query performed by a terminal on a database.

BRIEF DESCRIPTION OF DRAWINGS

FIG. 1 is a schematic logical diagram of parallel execution in a virtual machine according to an embodiment of the present application;

DESCRIPTION OF EMBODIMENTS

Figure 2:
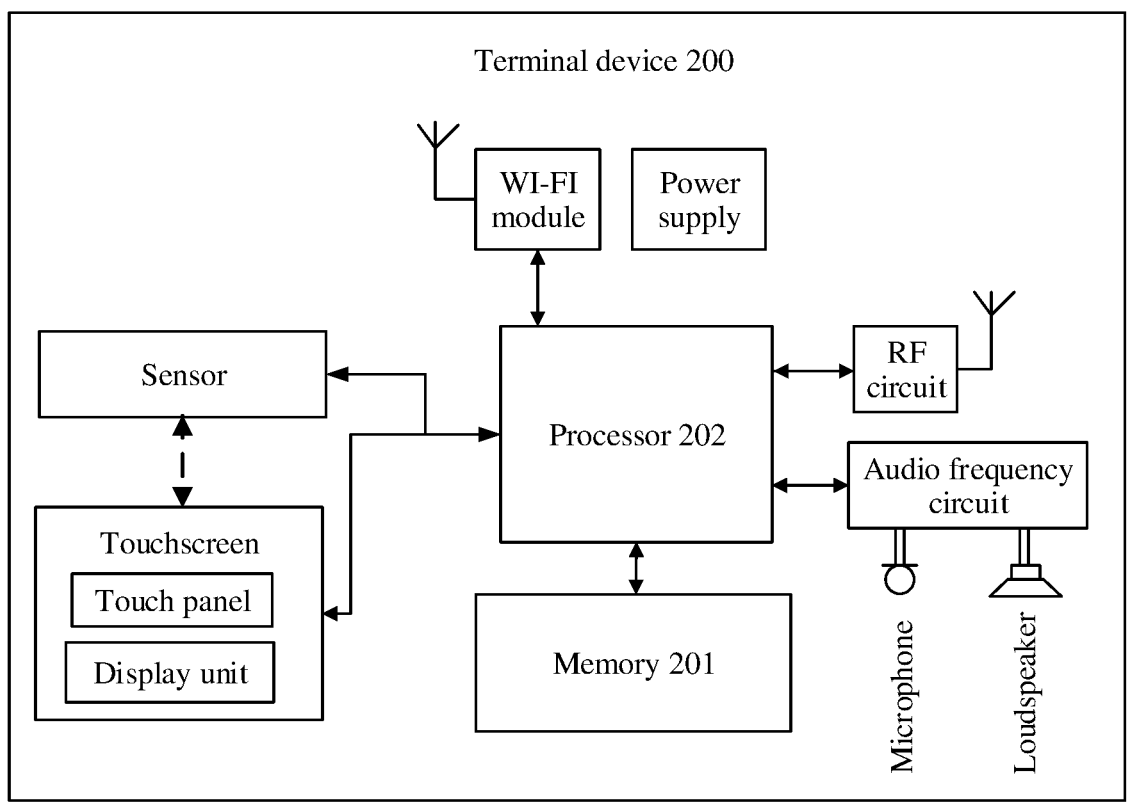
FIG. 2 is a schematic diagram of an internal structure of a terminal device according to an embodiment of the present application.

The following clearly and describes the technical solutions in the embodiments of the present application with reference to the accompanying drawings in the embodiments of the present application. The described embodiments are merely some but not all of the embodiments of the present application. All other embodiments obtained by persons of ordinary skill in the art based on the embodiments of the present application without creative efforts shall fall within the protection scope of the present application.

Embodiments of the present application provide a parallel execution method and apparatus in a terminal database in order to resolve a problem that if there are different cores such as a big core and a little core in a terminal CPU, parallel execution cannot be implemented in the terminal database using multiple cores. The method and the apparatus are based on a same application concept. Because a problem resolving rule of the method is similar to that of the apparatus, reference may be mutually made in implementations of the apparatus and the method, and no repeated description is provided.

The following describes implementations of the present application in detail with reference to the accompanying drawings.

Because frequencies of a big core and a little core in a terminal CPU are different, in the parallel execution method in the terminal database in the embodiments of the present application, a data table area in the database is dynamically divided according to a current terminal CPU frequency proportion in a dynamic partition process of the terminal database in order to ensure that execution duration of different CPUs is not obviously different, thereby greatly reducing CPU waiting duration when database result sets are combined. In the present application, a parallel execution function of the terminal database is implemented in combination with a parallel execution engine of the terminal database. The following uses a most commonly used SQLITE database in databases of a mobile phone terminal as an example to describe a method for implementing the parallel execution engine of the terminal database.

An instruction table shown in FIG. 1 describes parallel execution logic of a virtual machine. When starting to execute an instruction of the virtual machine, the execution engine first creates an auxiliary thread according to a predetermined degree of parallelism. In FIG. 1, two auxiliary threads are created according to an instruction 2 and an instruction 3, and a to-be-queried data table is dynamically divided into partitions according to a frequency of a main thread and a frequency of the auxiliary thread (i.e., an instruction 4 in FIG. 1). The degree of parallelism is a quantity of threads executed in parallel.

The main thread and each auxiliary thread execute respective code segments according to pre-generated parallel execution logic of the virtual machine. For example, in the foregoing case in FIG. 1, the main thread executes instructions 5 to 20, then directly skips to an instruction 41 when seeing an instruction 21, and skips to an instruction 61 when seeing the instruction 41. An auxiliary thread 1 skips to the instruction 21, executes instructions 21 to 40, and then exits. An auxiliary thread 2 skips to the instruction 41, executes instructions 41 to 60, and then exits.

When executing the instruction 61, the main thread waits until all threads exit, and combines result sets and returns an execution result.

The instruction 4 in FIG. 1 is used for dynamic partition of a data table in order to divide the data table into multiple partitions that do not overlap, thereby ensuring that data is not repeatedly accessed by different threads. For different databases, because implementation mechanisms of data tables in the databases are different, there are different partition methods.

FIG. 2 shows an internal structure of a terminal device 200 according to an embodiment of the present application. The terminal device 200 may include a mobile phone, a tablet computer, a personal digital assistant (PDA), a point of sales (POS) device, a vehicle-mounted computer, a desktop computer, a notebook, a server, or the like.

As shown in FIG. 2, an interior of the terminal device 200 may include a processor 202 and a memory 201 connected to the processor 202, and optionally, may further include external devices such as a sensor, a touchscreen, a loudspeaker, and a microphone. When communicating with the outside in a wireless manner, the terminal device 200 may further include a radio frequency (RF) circuit and an antenna connected thereto, a WI-FI module and an antenna connected thereto, and the like. In addition, the terminal device 200 further includes a power supply that supplies power to the terminal device 200.

Persons killed in the art may understand that, the internal structure of the terminal device 200 shown in FIG. 2 does not constitute a limitation on the terminal device 200, and may include components more or fewer than those shown in FIG. 1, or combine some components, or have different component arrangements.

The following describes each constituent component of the terminal device 200 with reference to FIG. 2.

The memory 201 may be configured to store a program and data. By running the program stored in the memory 201, the processor 202 executes various functional applications of the terminal device 200 and performs data processing.

The memory 201 may mainly include a program storage area and a data storage area. The data storage area may store data (for example, audio data or a phonebook) that is created according to use of the terminal device 200, and the like. The data storage area in this embodiment of the present application stores a database of the terminal device 200. The program storage area may store an operating system (for example, an ANDROID operating system, referred to as an "ANDROID system," or an IOS operating system, referred to as an "IOS system," where the operating system may also be referred to as a "system"), an instruction required by at least one function (for example, an audio play function or a video play function), and the like. The instruction can enable the processor 202 to perform the following method. The method includes determining each thread CPU based on a preset degree of parallelism, where the degree of parallelism is a quantity of threads executed in parallel, obtaining a frequency of each thread CPU, calculating a frequency proportion of the thread CPUs, dividing a to-be-queried data table in the database of the terminal device 200 into data partitions based on the frequency proportion of the thread CPUs, determining a data partition corresponding to each thread CPU, and querying in parallel, by the terminal device, data in the corresponding data partition using each thread CPU.

Running the operating system stored in the memory 201, the processor 202 invokes an application program and completes a function provided by the application program. In addition, the operating system may further control the touchscreen and the sensor.

In this embodiment of the present application, the operating system in the terminal device 200 invokes the program stored in the memory 201 to complete a parallel execution procedure, provided in this embodiment of the present application, of the database of the terminal device.

In addition, the memory 201 may include a high-speed random access memory (RAM), and may further include a non-volatile memory, for example, at least one magnetic disk storage component, a flash memory component, or another volatile solid-state storage component.

The touchscreen may include a touch panel, a display unit, and the like.

The touch panel, also referred to as a touchscreen, can collect a touch operation of a user on or near the touch panel (for example, an operation performed by the user on the touch panel or near the touch panel using any proper object or accessory, such as a finger or a stylus), and drive a corresponding connection apparatus according to a preset program.

Optionally, the touch panel may include two parts, a touch detection apparatus and a touch controller.

The touch detection apparatus detects a touch location of the user, detects a signal brought by the touch operation, and sends the signal to the touch controller. The touch controller receives touch information from the touch detection apparatus, converts the touch information into coordinates of a touch point, then sends the coordinates of the touch point to the processor 202, and can receive and execute a command sent by the processor 202.

In addition, the touch panel may be implemented using multiple types such as a resistance type, a capacitance type, an infrared ray, and a surface acoustic wave.

The display unit may be configured to display information entered by the user or information provided for the user, and various menus of the terminal device 200. Optionally, the display unit may be configured in a form of a liquid crystal display (LCD), an organic light-emitting diode (OLED), or the like. Further, the touch panel may cover the display unit. When detecting the touch operation on or near the touch panel, the touch panel transfers the touch operation to the processor 202 to determine a type of a touch event, and then the processor 202 provides corresponding visual output on the display unit according to the type of the touch event.

As shown in FIG. 2, the touch panel and the display unit may be integrated into the touchscreen to implement an input function and an output function of the terminal device 200, or the touch panel and the display unit may serve as two independent components to respectively implement an input function and an output function of the terminal device 200. This is not limited in this embodiment of the present application.

Further, the touch detection apparatus and the touch controller may be implemented in one chip. The touch controller converts a received signal into information related to an input operation (for example, an input location, a type of the input operation, input duration, and a quantity of touch points at which a user corresponding to the input operation touches the touchscreen), and sends, to the processor 202, the generated information related to the input operation.

The RF circuit may be configured to receive and send a signal in an information receiving and sending process or a call process, and particularly, after receiving downlink information sent by a base station, send the downlink information to the processor 202 for processing, and in addition, send uplink data to the base station.

Generally, the RF circuit includes but is not limited to an antenna, at least one amplifier, a transceiver, a coupler, a low noise amplifier (LNA), a duplexer, and the like.

In addition, the RF circuit may further communicate with a network and another device by means of wireless communication.

The wireless communication may use any one communications standard or protocol, including but not limited to the following.

Global System for Mobile Communications (GSM), a general packet radio service (GPRS), Code Division Multiple Access (CDMA), Wideband CDMA (WCDMA), Long Term Evolution (LTE), an electronic mail (e-mail), a short message service (SMS), and the like.

In FIG. 2, an audio frequency circuit, the loudspeaker, and the microphone may provide an audio interface between the user and the terminal device 200.

The audio frequency circuit may convert received audio data into an electrical signal, and transmit the electrical signal to the loudspeaker, and the loudspeaker converts the electrical signal into a sound signal for output. In addition, the microphone converts a collected sound signal into an electrical signal, and the audio frequency circuit receives the electrical signal, converts the electrical signal into audio data, and then outputs the audio data to the RF circuit to send the audio data to another electronic device such as a mobile phone, or outputs the audio data to the memory 201 for further processing.

WI-FI is a short-distance wireless transmission technology. The terminal device 200 may help, using a WI-FI module, the user to receive and send an e-mail, browse a webpage, access streaming media, and the like. The WI-FI module provides wireless broadband Internet access for the user.

Although the WI-FI module is shown in FIG. 2, it may be understood that the WI-FI module is not a mandatory part of the terminal device 200, and may be completely omitted according to a requirement without changing the essence of this embodiment of the present application.

The processor 202 is a control center of the terminal device 200, and is connected to each part of the entire terminal device 200 using various interfaces and lines, and executes various functions of the terminal device 200 and processes data by running or executing the program (or referred to as a "module") stored in the memory 201 and invoking the data stored in the memory 201, thereby performing overall monitoring on the terminal device 200.

Optionally, the processor 202 may include at least one processing unit. Optionally, an application processor and a modem processor may be integrated into the processor 202. The application processor mainly processes an operating system, a user interface, an application program, and the like, and the modem processor mainly processes wireless communication. It may be understood that the modem processor may not be integrated into the processor 202.

The terminal device 200 further includes the power supply (for example, a battery) that supplies power to each component. Optionally, the power supply may be logically connected to the processor 202 using a power supply management system in order to manage functions such as charging, discharging, and power consumption using the power supply management system.

As shown in FIG. 2, the terminal device 200 may further include the sensor (for example, a light sensor or a motion sensor).

The light sensor may include an ambient light sensor and a proximity sensor.

The ambient light sensor can adjust luminance of the display unit according to brightness and dimness of ambient light, and the proximity sensor may disable the display unit and/or backlight when the terminal device 200 moves to an ear.

As a type of the motion sensor, an accelerometer sensor may detect a value of acceleration in each direction (generally, three axes), and detect a value and a direction of gravity in a static mode, and may be applied to an application used for identifying a mobile phone gesture (for example, screen switching between a landscape mode and a portrait mode, a related game, and magnetometer posture calibration), a function related to vibration recognition (for example, a pedometer or a knock), and the like.

Other sensors, such as a gyroscope, a barometer, a hygrometer, a thermometer, and an infrared sensor may be further configured in the terminal device 200. Details are not described herein.

In addition, the terminal device 200 may further include a camera, a BLUETOOTH module, and the like. Details are not described herein.

The following describes the parallel execution procedure, provided in this embodiment of the present application, of the database of the terminal device.

That these procedures are executed by the terminal device 200 provided above is used an example for description, but it should be understood that these procedures may be applied to various electronic devices that have memories and processors in order to implement a parallel query in the database of the terminal device.

Figure 3:
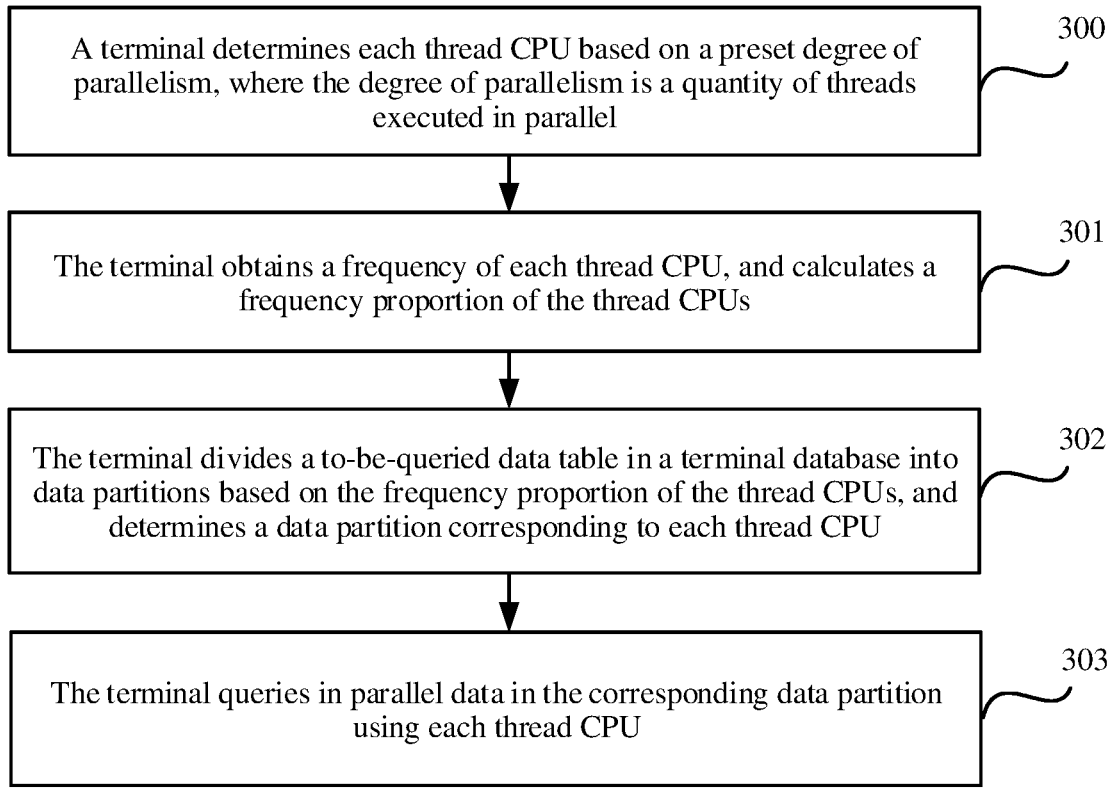
FIG. 3 is a flowchart of a parallel execution method in a terminal database according to an embodiment of the present application.

A key point of the present application is taking a CPU frequency factor into consideration when a data table is being divided into partitions, and performing partition according to a CPU frequency proportion such that execution duration of CPUs with different frequencies can be the same as far as possible. Further, referring to FIG. 3, FIG. 3 shows a parallel execution method in a terminal database according to an embodiment of the present application. A specific process is as follows.

Step 300: A terminal determines each thread CPU based on a preset degree of parallelism, where the degree of parallelism is a quantity of threads executed in parallel.

Step 301: The terminal obtains a frequency of each thread CPU, and calculates a frequency proportion of the thread CPUs.

For example, the terminal is a quad-core mobile phone with four CPUs, the four CPUs of the terminal are respectively represented by a CPU 1, a CPU 2, a CPU 3, and a CPU 4, and the preset degree of parallelism N is 3. In this case, three of the four CPUs need to be selected as thread CPUs, and it is assumed that the CPU 1, the CPU 2, and the CPU 3 are respectively determined as thread CPUs corresponding to three threads. If frequencies of the three thread CPUs of the mobile phone are U.S. Pat. Nos. 2,016,000, 1,017,600, and 1,516,800 respectively, a frequency proportion of the three thread CPUs is 4:2:3 after calculation.

Step 302: The terminal divides a to-be-queried data table in the terminal database into data partitions based on the frequency proportion of the thread CPUs, and determines a data partition corresponding to each thread CPU.

The terminal divides the to-be-queried data table in the terminal database into the data partitions based on the frequency proportion of the thread CPUs according to the following two implementation solutions.

Solution 1: The terminal reads a quantity of layer-1 subpages that are in the data table and that are connected to an index root page, and divides the layer-1 subpages into N data partitions according to the frequency proportion of the thread CPUs. In this case, a quantity proportion of the layer-1 subpages in the N data partitions is equal to or approximately equal to the frequency proportion of the thread CPUs, and N is the preset degree of parallelism.

Optionally, when data partition is being performed on the to-be-queried data table in the terminal database, if the quantity of layer-1 subpages is greater than a preset threshold, the solution 1 is used.

For example, for the same terminal in the foregoing example, if the quantity of layer-1 subpages in the to-be-queried data table in the terminal database is 9 greater than a preset threshold 8, the nine layer-1 subpages are divided into three partitions according to the proportion 4:2:3. If the three data partitions are a partition 1, a partition 2, and a partition 3 respectively, the partition 1 includes four layer-1 subpages, and the four layer-1 subpages may be four layer-1 subpages whose serial numbers are 1 to 4 in the layer-1 subpages, the partition 2 includes two layer-1 subpages, and the two layer-1 subpages may be two layer-1 subpages whose serial numbers are 5 and 6 in the layer-1 subpages, and the partition 3 includes three layer-1 subpages, and the three layer-1 subpages may be three layer-1 subpages whose serial numbers are 7 to 9 in the layer-1 subpages. It should be noted that, provided that the quantity proportion of the layer-1 subpages in the N data partitions is equal to or approximately equal to the frequency proportion of the thread CPUs, a method for dividing data in each layer-1 subpage in each data partition is not limited.

Solution 2: The terminal reads a quantity of data recorded in each subpage in layer-1 subpages that are in the data table and that are connected to an index root page, and divides, based on the quantity of data recorded in each subpage and according to the frequency proportion of the thread CPUs, data recorded in the layer-1 subpages into N data partitions. In this case, a quantity proportion of the data recorded in the layer-1 subpages in the N data partitions is equal to or approximately equal to the frequency proportion of the thread CPUs, and N is the preset degree of parallelism.

Optionally, when data partition is being performed on the to-be-queried data table in the terminal database, if the quantity of layer-1 subpages is not greater than the preset threshold, the solution 2 is used.

For example, for the same terminal in the foregoing example, if the quantity of layer-1 subpages in the to-be-queried data table in the terminal database is 2 less than the preset threshold 8, the terminal reads quantities of data recorded in the two layer-1 subpages. If a quantity of data recorded in a first subpage is 40, and a quantity of data recorded in a second subpage is 50, 90 data records are divided into three partitions according to the proportion 4:2:3. If the three data partitions are a partition 1, a partition 2, and a partition 3 respectively, the partition 1 includes 40 data records, and the 40 data records may be the data recorded in the first layer-1 subpage, the partition 2 includes 20 data records, and the 20 data records may be first 20 data records in the second layer-1 subpage, and the partition 3 includes 30 data records, and the 30 data records may be last 30 data records in the second layer-1 subpage. It should be noted that, provided that the quantity proportion of the data recorded in the layer-1 subpages in the N data partitions is equal to or approximately equal to the frequency proportion of the thread CPUs, a method for dividing data according to a quantity of data recorded in a layer-1 subpage in each data partition is not limited.

Step 303: The terminal queries in parallel data in the corresponding data partition using each thread CPU.

For example, for the same terminal in the foregoing example, if the frequency proportion of the thread CPUs in the terminal is 4:2:3, the to-be-queried data table is divided into three data partitions. Assuming that the three data partitions are a partition 1, a partition 2, and a partition 3 respectively, the terminal queries in parallel data in a corresponding data partition using each thread CPU. That is, for data in the partition 1, a data query function is executed using the CPU 1 of the terminal, for data in the partition 2, a data query function is executed using the CPU 2 of the terminal, and for data in the partition 3, a data query function is executed using the CPU 3 of the terminal.

The following uses a data table implemented in a B-tree form as an example to describe the method in FIG. 3.

Figure 4:
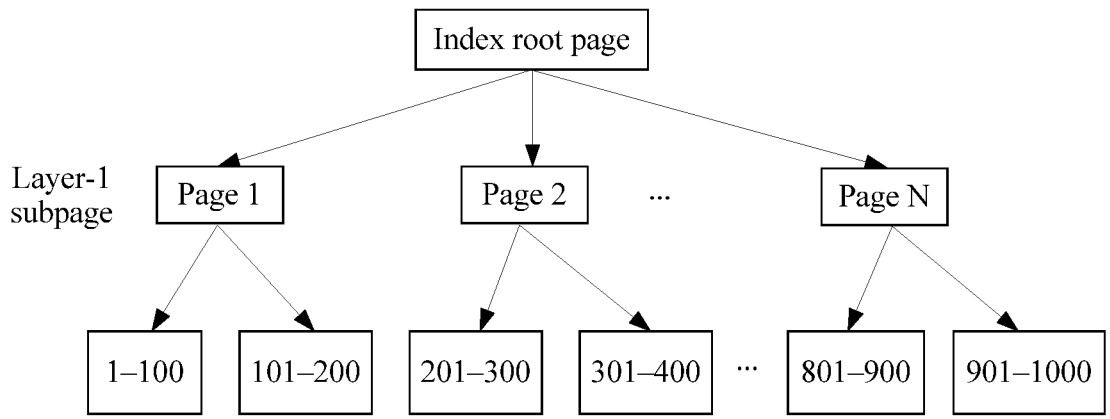
FIG. 4 is a schematic diagram of a data table implemented in a B-tree form in a terminal database.

As shown in FIG. 4, the data table implemented in a B-tree form is used in a database of a mobile phone terminal, data in the data table is organized in a B-tree structure, and a lowest-level node in the B-tree structure stores a data record. Values (for example, 1 to 100) on the lowest-level node in FIG. 4 represent identifier (ID) numbers recorded in the data table. The ID numbers recorded in this type of table structure are sequentially arranged from left to right. N data pages in a layer-1 subpage are respectively represented by a page 1, a page 2 . . . and a page N. The mobile phone terminal is the quad-core mobile phone terminal with four CPUs in the foregoing example.

This type of data table is organized in the B-tree structure using a primary key of an integer type, and the recorded ID number in FIG. 4 is a primary key. Therefore, the to-be-queried data table in the terminal database can be divided into data partitions by reading records in a root page and a layer-1 subpage.

Data partition needs to be performed according to a current thread CPU frequency proportion. For example, if frequencies of three thread CPUs are U.S. Pat. Nos. 2,016,000, 1,017,600, and 1,516,800 respectively, that is, a frequency proportion of the three thread CPUs is 4:2:3, a proportion of data partitions of the three threads should be the same as or closer to 4:2:3. Therefore, a quantity of data pages including a page 1 to a page N in the recorded layer-1 subpage in FIG. 4 is read.

If the quantity of data pages in the layer-1 subpage is greater than a preset threshold, assuming that the preset threshold is 8, all data recorded in the page 1 to the page N in the layer-1 subpage does not need to be read for division. Instead, the page 1 to the page N in the layer-1 subpage are directly divided according to the proportion 4:2:3, and data partition can be completed by finding a corresponding primary key value. If there are 30 pages in the layer-1 subpage, the layer-1 subpage may be divided according to the proportion 4:2:3, and a result is (14, 6, 10). That is, data recorded in first 14 data pages in the layer-1 subpage is executed by a thread CPU 1, data recorded in middle six data pages in the layer-1 subpage is executed by a thread CPU 2, and data recorded in last 10 data pages in the layer-1 subpage is executed by a thread CPU 3.

If the quantity of data pages in the layer-1 subpage is not greater than a preset threshold, assuming that the preset threshold is 8, for example, the layer-1 subpage includes only two data pages, a first data page and a second data page, quantities of data recorded in the two data pages in the layer-1 subpage need to be read in this case. The first data page includes 40 data records, the second data page includes 50 data records, and a quantity (that is, 40+50=90) of data records in the layer-1 subpage are divided according to the proportion 4:2:3. That is, data recorded in the first data page is executed by a thread CPU 1, first 20 records in the second data page is executed by a thread CPU 2, and last 30 records in the second data page is executed by a thread CPU 3.

Figure 5:
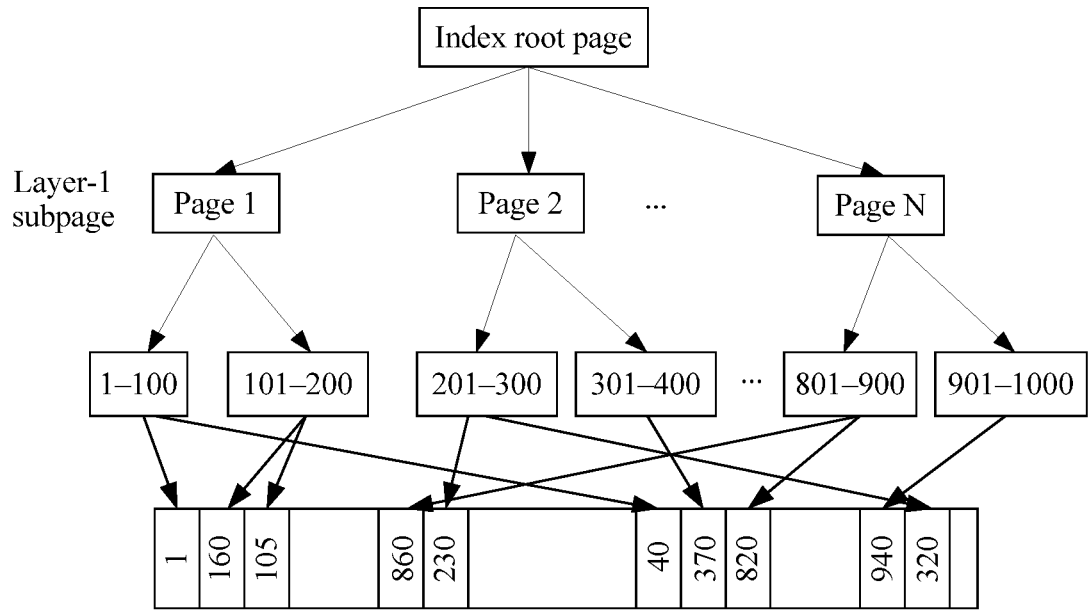
FIG. 5 is a schematic diagram of a data table implemented in a heap form in a terminal database.

Another common organization form of a data table is a heap table. Referring to FIG. 5, this form of data table is organized according to an insertion sequence of data records, without a primary key field or with a primary key field that is a separate index, that is, data records in the data table are not sorted according to a primary key. A dynamic partition method for this form of data table is completely the same as the dynamic partition method for the data table in a B-tree form, and details are not described herein again.

Figure 6:
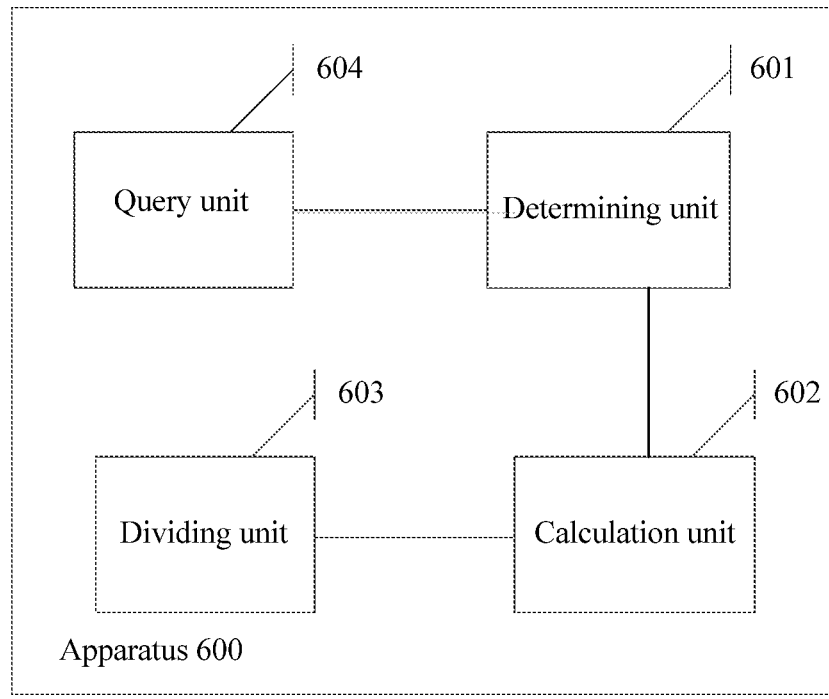
FIG. 6 is a schematic structural diagram of a parallel execution apparatus in a terminal database according to an embodiment of the present application.

Based on the parallel execution method in the terminal database provided in the foregoing embodiment, referring to FIG. 6, an embodiment of the present application provides a parallel execution apparatus 600 in a terminal database. The apparatus 600 may be configured to execute the method in FIG. 3. FIG. 6 shows a schematic structural diagram of the apparatus 600 provided in this embodiment of the present application. As shown in FIG. 6, the apparatus 600 includes a determining unit 601, a calculation unit 602, a dividing unit 603, and a query unit 604.

The determining unit 601 is configured to determine each thread CPU based on a preset degree of parallelism, where the degree of parallelism is a quantity of threads executed in parallel.

The calculation unit 602 is configured to obtain a frequency of each thread CPU, and calculate a frequency proportion of the thread CPUs.

The dividing unit 603 is configured to divide a to-be-queried data table in the terminal database into data partitions based on the frequency proportion of the thread CPUs, and determine a data partition corresponding to each thread CPU.

The query unit 604 is configured to query in parallel data in the corresponding data partition using each thread CPU.

Optionally, when dividing the to-be-queried data table in the terminal database into the data partitions based on the frequency proportion of the thread CPUs, the dividing unit 603 is configured to read a quantity of layer-1 subpages that are in the data table and that are connected to an index root page, and divide the layer-1 subpages into N data partitions according to the frequency proportion of the thread CPUs, where N is the preset degree of parallelism.

Optionally, a quantity proportion of the layer-1 subpages in the N data partitions is equal to or approximately equal to the frequency proportion of the thread CPUs.

Optionally, when dividing the to-be-queried data table in the terminal database into the data partitions based on the frequency proportion of the thread CPUs, the dividing unit 603 is configured to read a quantity of data recorded in each subpage in layer-1 subpages that are in the data table and that are connected to an index root page, and divide, based on the quantity of data recorded in each subpage and according to the frequency proportion of the thread CPUs, data recorded in the layer-1 subpages into N data partitions, where N is the preset degree of parallelism.

Optionally, a quantity proportion of the data recorded in the layer-1 subpages in the N data partitions is equal to or approximately equal to the frequency proportion of the thread CPUs.

Optionally, the data table is a data table in a B-tree format or a data table in a heap format.

The apparatus 600 in this embodiment of the present application may be an independent component, or may be integrated into another component.

It should be noted that, for a function implementation and an interaction manner of each unit in the apparatus 600 in this embodiment of the present application, further refer to descriptions in a related method embodiment. Details are not described herein again.

In conclusion, in this embodiment of the present application, the apparatus 600 determines each thread CPU based on a preset degree of parallelism, where the degree of parallelism is a quantity of threads executed in parallel. The apparatus 600 obtains a frequency of each thread CPU, and calculates a frequency proportion of the thread CPUs. The apparatus 600 divides a to-be-queried data table in a terminal database into data partitions based on the frequency proportion of the thread CPUs, and determines a data partition corresponding to each thread CPU, and the apparatus 600 queries in parallel data in the corresponding data partition using each thread CPU. In this way, the to-be-queried data table in the terminal database can be dynamically divided into partitions based on a frequency factor of each thread CPU in the apparatus 600. In addition, parallel processing of a query instruction is performed on a corresponding data partition using each thread CPU, thereby greatly improving execution efficiency of a parallel query performed by the apparatus 600 on a database.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc read-only memory (CD-ROM), an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although some embodiments of the present application have been described, persons skilled in the art can make changes and modifications to these embodiments once they learn the basic inventive concept. Therefore, the following claims are intended to be construed as to cover the embodiments and all changes and modifications falling within the scope of the present application.

Obviously, persons skilled in the art can make various modifications and variations to the embodiments of the present application without departing from the spirit and scope of the embodiments of the present application. The present application is intended to cover these modifications and variations provided that they fall within the scope of protection defined by the following claims and their equivalent technologies.

What is claimed is:

1. A parallel execution method in a terminal database implemented by a processor of a terminal, wherein the parallel execution method comprises:
selecting a set of central processing units (CPUs) from a plurality of CPUs in the terminal based on a preset degree of parallelism, wherein the preset degree of parallelism indicates a quantity of threads executed in parallel;
obtaining a frequency of each selected CPU;
calculating a frequency proportion of the selected CPUs;
dividing a to-be-queried data table in the terminal database into data partitions based on the frequency proportion of the selected CPUs, wherein dividing the to-be-queried data table comprises:
reading a quantity of data recorded in each subpage in layer-1 subpages in the to-be-queried data table that are connected to an index root page; and
dividing, based on the quantity of data recorded in each subpage and according to the frequency proportion of the selected CPUs, data recorded in the layer-1 subpages into N data partitions, wherein N equals to the preset degree of parallelism, and wherein a quantity proportion of the data recorded in the layer-1 subpages in the N data partitions is equal to the frequency proportion of the selected CPUs;
determining a data partition corresponding to each selected CPU; and
executing, in parallel a query function on data in a corresponding data partition using each selected CPU.

2. The parallel execution method of claim 1, wherein dividing the to-be-queried data table in the terminal database into the data partitions further comprises:
reading a quantity of layer-1 subpages in the to-be-queried data table that are coupled to an index root page; and
dividing the layer-1 subpages into N data partitions according to the frequency proportion of the selected CPUs, wherein N equals to the preset degree of parallelism.

3. The parallel execution method of claim 2, wherein a quantity proportion of the layer-1 subpages in the N data partitions is equal to the frequency proportion of the selected CPUs.

4. The parallel execution method of claim 2, wherein reading the quantity of layer-1 subpages comprises reading the quantity of layer-1 subpages in the to-be-queried data table when a quantity of layer-1 subpages is greater than a preset threshold.

5. The parallel execution method of claim 1, wherein the to-be-queried data table is in a B-tree format.

6. The parallel execution method of claim 5, wherein data records are organized using a primary key in the B-tree format.

7. The parallel execution method of claim 1, wherein the to-be-queried data table is in a heap format.

8. The parallel execution method of claim 7, wherein data records are organized according to an insertion sequence in the heap format.

9. The parallel execution method of claim 1, wherein the terminal is a quad-core mobile phone.

10. The parallel execution method of claim 1, wherein reading the quantity of data recorded comprises reading the quantity of data recorded in each subpage in layer-1 subpages in the to-be-queried data table when a quantity of layer-1 subpages is less than a preset threshold.

11. A parallel execution apparatus in a terminal database, comprising:
a memory comprising instructions; and
a processor coupled to the memory, wherein the instructions cause the processor to be configured to:
select a set of central processing units (CPUs) from a plurality of CPUs based on a preset degree of parallelism, wherein the preset degree of parallelism indicates a quantity of threads executed in parallel;
obtain a frequency of each selected CPU;
calculate a frequency proportion of the selected CPUs;
divide a to-be-queried data table in the terminal database into data partitions based on the frequency proportion of the selected CPUs, wherein when dividing the to-be-queried data table, the instructions further cause the processor to be configured to:
read a quantity of data recorded in each subpage in layer-1 subpages in the to-be-queried data table that are connected to an index root page; and
divide, based on the quantity of data recorded in each subpage and according to the frequency proportion of the selected CPUs, data recorded in the layer-1 subpages into N data partitions, wherein N equals to the preset degree of parallelism, and wherein a quantity proportion of the data recorded in the layer-1 subpages in the N data partitions is equal to the frequency proportion of the selected CPUs;
determine a data partition corresponding to each selected CPU; and
execute, in parallel, a query function on data in a corresponding data partition using each selected CPU.

12. The parallel execution apparatus of claim 11, wherein when dividing the to-be-queried data table in the terminal database into the data partitions, the instructions further cause the processor to be configured to:
read a quantity of layer-1 subpages in the to-be-queried data table that are coupled to an index root page; and
divide the layer-1 subpages into N data partitions according to the frequency proportion of the selected CPUs, wherein N equals to the preset degree of parallelism.

13. The parallel execution apparatus of claim 12, wherein a quantity proportion of the layer-1 subpages in the N data partitions is equal to the frequency proportion of the selected CPUs.

14. The parallel execution apparatus of claim 12, wherein when reading the quantity of layer-1 subpages, the instructions further cause the processor to be configured to read the quantity of layer-1 subpages in the to-be-queried data table when a quantity of layer-1 subpages is greater than a preset threshold.

15. The parallel execution apparatus of claim 11, wherein the to-be-queried data table is in a B-tree format.

16. The parallel execution apparatus of claim 15, wherein data records are organized using a primary key in the B-tree format.

17. The parallel execution apparatus of claim 11, wherein the to-be-queried data table is in a heap format.

18. The parallel execution apparatus of claim 17, wherein data records are organized according to an insertion sequence in the heap format.

19. The parallel execution apparatus of claim 11, wherein the terminal is a quad-core mobile phone.

20. The parallel execution apparatus of claim 11, wherein when reading the quantity of data recorded, the instructions further cause the processor to be configured to read the quantity of data recorded in each subpage in layer-1 subpages in the to-be-queried data table when a quantity of layer-1 subpages is less than a preset threshold.

* * * * *